(12) United States Patent
Fukui et al.

(10) Patent No.: US 8,581,095 B2
(45) Date of Patent: Nov. 12, 2013

(54) PHOTOELECTRODE, AND DYE-SENSITIZED SOLAR CELL AND DYE-SENSITIZED SOLAR CELL MODULE USING THE SAME

(75) Inventors: Atsushi Fukui, Kashiba (JP); Ryohsuke Yamanaka, Gojyo (JP); Liyuan Han, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 817 days.

(21) Appl. No.: 11/659,080

(22) PCT Filed: Aug. 1, 2005

(86) PCT No.: PCT/JP2005/014053
§ 371 (c)(1),
(2), (4) Date: Feb. 1, 2007

(87) PCT Pub. No.: WO2006/013830
PCT Pub. Date: Feb. 9, 2006

(65) Prior Publication Data
US 2008/0308155 A1    Dec. 18, 2008

(30) Foreign Application Priority Data
Aug. 4, 2004    (JP) .................................. 2004-228122

(51) Int. Cl.
*H01L 31/00*    (2006.01)
(52) U.S. Cl.
USPC ............................ 136/263; 136/255; 136/256
(58) Field of Classification Search
USPC .......................................... 136/263, 255–256
See application file for complete search history.

(56) References Cited

U.S. PATENT DOCUMENTS

| | | | |
|---|---|---|---|
| 4,257,156 A | 3/1981 | Houston |
| 4,260,429 A | 4/1981 | Moyer |
| 4,365,107 A | 12/1982 | Yamauchi |
| 4,385,102 A | 5/1983 | Fitzky et al. |
| 4,754,544 A | 7/1988 | Hanak |
| 4,759,951 A | 7/1988 | Itoh et al. |
| 4,927,721 A | 5/1990 | Gratzel et al. |
| 5,084,365 A | 1/1992 | Gratzel et al. |
| 5,538,902 A | 7/1996 | Izu et al. |

(Continued)

FOREIGN PATENT DOCUMENTS

| | | |
|---|---|---|
| JP | 53-54494 | 4/1978 |
| JP | 57-148862 | 9/1982 |

(Continued)

OTHER PUBLICATIONS

International Search Report for PCT/JP2005/014053 mailed Nov. 8, 2005.

(Continued)

*Primary Examiner* — Jonathan Johnson
*Assistant Examiner* — Thanh-Truc Trinh
(74) *Attorney, Agent, or Firm* — Nixon & Vanderhye P.C.

(57) ABSTRACT

A photoelectrode has a conductive substrate and a semiconductor layer formed on the conductive substrate, the semiconductor layer being formed of semiconductor particles, the semiconductor layer having a plurality of layers, the plurality of layers being different in an average particle diameter of semiconductor particles from one another, a distal layer of the plurality of layers, placed at a location farther from the substrate, covering at least a part of side faces of a proximal layer of the plurality of layers, placed at a location closer to the substrate.

9 Claims, 9 Drawing Sheets

(56) References Cited

U.S. PATENT DOCUMENTS

| | | | |
|---|---|---|---|
| 5,593,901 A | 1/1997 | Oswald et al. | |
| 5,639,314 A | 6/1997 | Kura et al. | |
| 6,043,428 A | 3/2000 | Han et al. | |
| 6,069,313 A * | 5/2000 | Kay | 136/249 |
| 6,291,763 B1 | 9/2001 | Nakamura | |
| 6,469,243 B2 | 10/2002 | Yamanaka et al. | |
| 6,479,745 B2 | 11/2002 | Yamanaka et al. | |
| 6,538,194 B1 | 3/2003 | Koyanagi et al. | |
| 6,652,904 B1 | 11/2003 | Phani et al. | |
| 6,677,516 B2 | 1/2004 | Chiba et al. | |
| 7,145,071 B2 | 12/2006 | Spivack et al. | |
| 7,851,699 B2 | 12/2010 | Yamanaka et al. | |
| 2001/0032665 A1 | 10/2001 | Han et al. | |
| 2002/0134426 A1* | 9/2002 | Chiba et al. | 136/263 |
| 2004/0112421 A1 | 6/2004 | Spivack et al. | |
| 2005/0045874 A1* | 3/2005 | Xiao et al. | 257/40 |
| 2010/0012166 A1 | 1/2010 | Yamanaka et al. | |
| 2010/0071743 A1 | 3/2010 | Yamanaka et al. | |

FOREIGN PATENT DOCUMENTS

| | | |
|---|---|---|
| JP | 05-013733 A | 1/1993 |
| JP | 5-504023 | 6/1993 |
| JP | 05-175527 A | 7/1993 |
| JP | 06-204544 A | 7/1994 |
| JP | 2664194 | 6/1997 |
| JP | 10-112337 | 4/1998 |
| JP | 10-255863 | 9/1998 |
| JP | 11-168230 | 6/1999 |
| JP | 11-288745 | 10/1999 |
| JP | 11-514787 | 12/1999 |
| JP | 2000-91609 | 3/2000 |
| JP | 2000-106222 | 4/2000 |
| JP | 2000-285976 | 10/2000 |
| JP | 2001-93591 | 4/2001 |
| JP | 2001-357897 | 12/2001 |
| JP | 2002-93475 | 3/2002 |
| JP | 2002-222968 | 8/2002 |
| JP | 2002-352868 | 12/2002 |
| JP | 2003-142169 | 5/2003 |
| JP | 2003-217688 | 7/2003 |
| JP | 2003-303629 | 10/2003 |
| WO | WO 97/16838 A1 | 5/1997 |
| WO | WO 99/63614 A | 12/1999 |
| WO | WO 2004/036683 A1 | 4/2004 |

OTHER PUBLICATIONS

Barbé et al., "Nanocrystalline Titanium Oxide Electrodes for Photovoltaic Applications", J. Am. Ceram. Soc., vol. 80, No. 12, pp. 3157-3171 (1997).

Japanese Office Action dated Jun. 1, 2010, issued in connection with corresponding Japanese Patent Application.

English Translation of International Preliminary Examination Report mailed Apr. 21, 2005 in corresponding PCT Application No. PCT/JP2003/012805.

* cited by examiner

X SUBSTRATE

Y SUBSTRATE

PHOTOELECTRODE, AND DYE-SENSITIZED SOLAR CELL AND DYE-SENSITIZED SOLAR CELL MODULE USING THE SAME

This application is the US national phase of international application PCT/JP2005/014053 filed 1 Aug. 2005, which designated the U.S. and claimed priority of JP 2004-228122 filed 4 Aug. 2004, the entire contents of each of which are hereby incorporated by reference.

TECHNICAL FIELD

The present invention relates to a photoelectrode, and a dye-sensitized solar cell and a dye-sensitized solar cell module using the same. The photoelectrode of the present invention is suitably used for producing a dye-sensitized solar cell having high conversion efficiency.

BACKGROUND ART

Conventionally, a silicon crystal solar cell is well known as a method of directly converting optical energy to electric energy and it has been widely used in the area of consuming feeble power and for standalone power supply and space power supply. However, since enormous energy is required for producing amorphous silicon as well as silicon single crystal, it is necessary to continue electric power generation for a long time period of nearly ten years in order to recover energy consumed for manufacturing a battery.

In such a situation, a dye-sensitized solar cell using a dye has received widespread attention. This dye-sensitized solar cell is predominantly composed of a semiconductor porous electrode, carrying a sensitizing dye, formed on a transparent conductive layer on a transparent substrate, a counter electrode and a carrier transport layer sandwiched between these electrodes and expected as a next-generation solar cell because of the ease of a fabrication method and low material cost.

In J. Am. Ceram. Soc., 80 (12), 1997, p3157-3171, there is described a fabrication method of a dye-sensitized solar cell in which a sensitizing dye such as transition metal complex is adsorbed on the surface of titanium oxide. In this method, by immersing the titanium oxide porous electrode formed in a transparent conductive layer on a transparent substrate in a solvent in which a sensitizing dye is dissolved, the porous electrode carries the sensitizing dye. Then, an electrolyte containing a redox system is added dropwise and a solar cell is prepared by overlaying the counter electrode on the porous electrode.

In this solar cell, when visible light is irradiated to a photoelectrode, the sensitizing dye on the surface of the semiconductor absorbs light, and thereby, an electron in a dye molecule is excited and an excited electron is injected into the photoelectrode. Thus, an electron is generated on this electrode side and this electron moves to the counter electrode through an electric circuit. The electron transferred to the counter electrode is transported by a hole or an ion in the carrier transport layer and returned back to the photoelectrode. A process like this is repeated and electric energy is drawn out to realize high energy conversion efficiency. However, further improvement in conversion efficiency is essential in order to commercialize this method as a solar cell, and therefore increases in a generated current (short-circuit current) and an open-circuit voltage are desired.

For the purpose of increasing the generated current, for example in Japanese Unexamined Patent Publication No. HEI 10 (1998)-255863, there is proposed a dye-sensitized solar cell which is intended to constitute a photoelectrode by providing a layer (layer of light reflecting particle) containing large semiconductor particles having an average particle diameter of, for example, 200 to 500 nm as a constituent material on a plane which is far away from a light receiving plane of a photoelectrode (layer of light absorbing particle) containing small semiconductor particles having an average particle diameter of, for example, 80 nm or less as a constituent material and to improve absorption efficiency of incident light by scattering incident light entering the photoelectrode by the light reflecting particle.

And, in Japanese Unexamined Patent Publication No. 2000-106222, there is proposed a dye-sensitized solar cell which is intended to improve absorption efficiency of incident light by scattering incident light entering the photoelectrode by arranging semiconductor particles (an average particle diameter; 10 to 300 nm) having a large particle diameter together with semiconductor particles (an average particle diameter; 10 nm or less) having a small particle diameter in a photoelectrode.

Further, in Japanese Unexamined Patent Publication No. 2002-222968 and Japanese Unexamined Patent Publication No. 2002-352868, by overlaying a plurality (three or more) of layers, the plurality of layers being different in an average particle diameter of semiconductor particles constituting a semiconductor layer from one another, an optical confinement effect in the semiconductor layer is improved and a generated current is increased.

DISCLOSURE OF THE INVENTION

Problems to be Solved by the Invention

However, the present inventors have found that in any of the above methods, sufficient energy conversion efficiency as a battery could not be attained since there was not only light scattered toward the interior of a semiconductor layer by scattering particles but also light scattered toward the outside of a semiconductor layer, particularly in the in-plane direction perpendicular to the direction of the incident light, by scattering particles and a light confinement effect could not be adequately achieved. And, when a layer thickness of the semiconductor layer is thickened in order to improve the light absorptance of a sensitizing dye, the above-mentioned problem becomes remarkable, and therefore it is important to reduce the light scattered toward the outside of a semiconductor layer for improving the energy conversion efficiency. The present invention has been made in view of the above-mentioned problem, and provides a photoelectrode which can be used for producing a dye-sensitized solar cell having an increased generated current and high photoelectric conversion efficiency by suppressing the light scattered toward the outside of a semiconductor layer.

Means for Solving the Problems

A photoelectrode of the present invention has a conductive substrate and a semiconductor layer formed on the conductive substrate, the semiconductor layer being formed of semiconductor particles, the semiconductor layer having a plurality of layers, the plurality of layers being different in an average particle diameter of semiconductor particles from one another, a distal layer of the plurality of layers, placed at a location farther from the substrate, covering at least a part of side faces of a proximal layer of the plurality of layers, placed at a location closer to the substrate.

Effect of the Invention

In accordance with the present invention, it is possible to inhibit light from leaving from side faces of a proximal layer and improve the utilization efficiency of light.

Figure 1A:
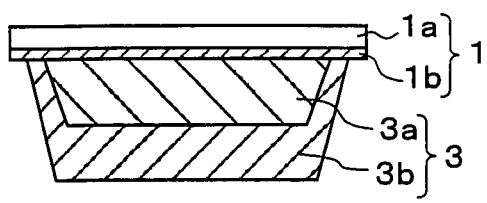
FIGS. 1A to 1E are sectional views each showing the structure of a photoelectrode (two-layer structure) of the present invention.

DESCRIPTION OF REFERENCE NUMBERS 1, 21, 23: conductive substrate, 1a, 21a, 23a: support substrate, 1b, 21b, 23b: conductive layer, 3, 13: semiconductor layer, 3a: proximal layer, 3b: distal layer, 5: photoelectrode, 7: counter electrode, 7a: support substrate, 7b: conductive layer, 7c: catalyst layer, 9: carrier transport layer, 11: spacer, 13a: first layer, 13b: second layer, 13c: third layer, 15: connecting layer, 17: opening, 25: scribe line

BEST MODE FOR CARRYING OUT THE INVENTION

1. Photoelectrode

A photoelectrode of the present invention has a conductive substrate and a semiconductor layer formed on the conductive substrate, the semiconductor layer being formed of semiconductor particles, the semiconductor layer having a plurality of layers, the plurality of layers being different in an average particle diameter of semiconductor particles from one another, a distal layer of the plurality of layers, placed at a location farther from the substrate, covering at least a part of side faces of a proximal layer of the plurality of layers, placed at a location closer to the substrate.

First, by use of FIGS. 1 and 2, a specific structure of the photoelectrode of the present invention will be exemplified. FIGS. 1 and 2 are just exemplifications and the scope of the present invention is not limited to the structures of FIGS. 1 and 2. Referring to FIGS. 1 and 2, the photoelectrode of the present invention has a conductive substrate 1 and a semiconductor layer 3 or 13 formed on the conductive substrate 1, the semiconductor layer being formed of semiconductor particles. The conductive substrate 1 has a support substrate 1a and a conductive layer 1b formed thereon. In FIG. 1, the semiconductor layer 3 has a proximal layer 3a and a distal layer 3b. In FIG. 2, the semiconductor layer 13 has a first, a second and a third layers 13a, 13b and 13c in this order from the substrate, and for example, the first layer 13a is a proximal layer and the second layer 13b or the third layer 13c is a distal layer. And, the second layer 13b may be designated as a proximal layer and the third layer 13c may be designated as a distal layer.

Figure 1B:
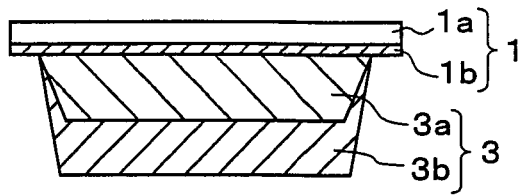
Figure 1C:
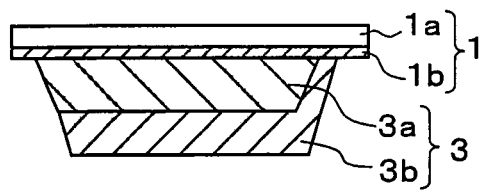
Figure 1D:
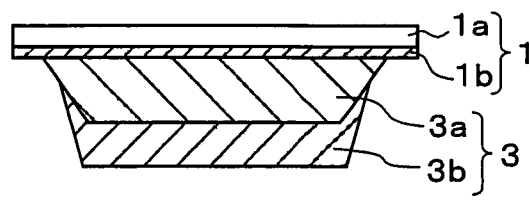
Figure 1E:
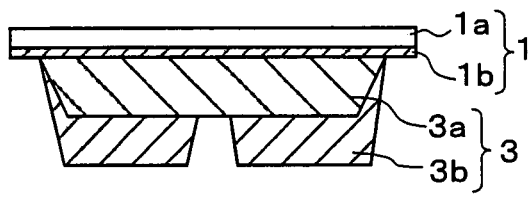

The scope of the present invention includes all of FIGS. 1A to 1E. Therefore, the scope of the present invention includes the case where the thickness of the distal layer 3b at the side faces of the proximal layer 3a is not constant as shown in FIG. 1B, the case where one of the side faces of the proximal layer 3a is fully exposed as shown in FIG. 1C, the case where only a part of the side faces of the proximal layer 3a is covered as shown in FIG. 1D, and the case where the distal layer 3b is divided into a plurality of sections or the distal layer 3b is provided with an opening as shown in FIG. 1E.

Figure 2A:
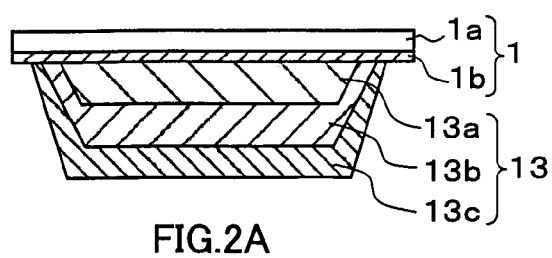
FIGS. 2A to 2E are sectional views each showing the structure of the photoelectrode (three-layer structure) of the present invention.
Figure 2B:
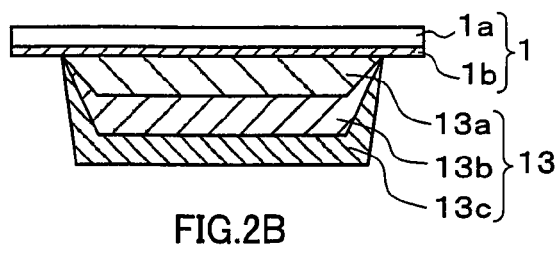
Figure 2C:
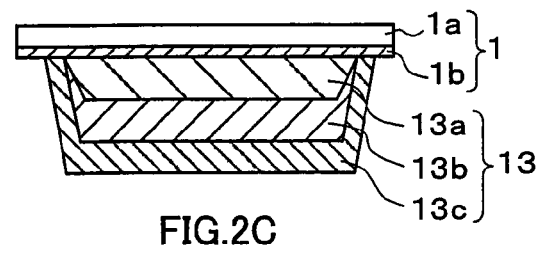
Figure 2D:
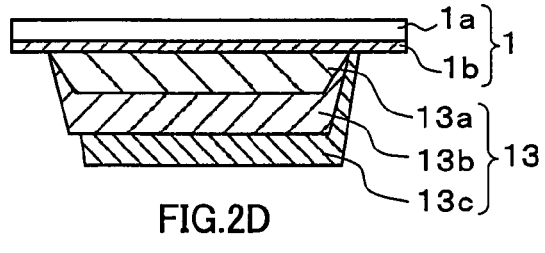
Figure 2E:
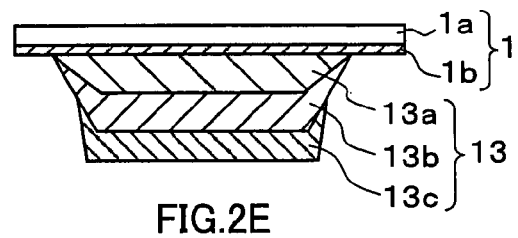

The scope of the present invention includes all of FIGS. 2A to 2E. Therefore, the scope of the present invention also includes the case where the thickness of the distal layer (the second or third layer) 13b or 13c at the side faces of the proximal layer (the first layer) 13a is not constant as shown in FIGS. 2B and 2C, the case where one of the side faces of the proximal layer (the second layer) 13b is exposed fully as shown in FIG. 2D, and the case where only a part of the side faces of the proximal layer (the second layer) 13b is covered as shown in FIG. 2E.

The semiconductor layer may be a two-layer structure or a three-layer structure as shown in FIGS. 1 and 2, or may be a structure with four or more layers.

By the way, the present invention can be put into practice in two embodiments described below.

1-1. First Embodiment

In the photoelectrode of the first embodiment, an average particle diameter of semiconductor particles contained in the distal layer is larger than that of semiconductor particles contained in the proximal layer.

In the first embodiment, light generally enters from a conductive substrate side and a part of the light is absorbed in the proximal layer and the rest of the light passes through the proximal layer and reaches the distal layer. The distal layer is likely to scatter (or reflect) incident light since it contains semiconductor particles having a larger average particle diameter. Therefore, most of the light having entered the distal layer is scattered and returned back to the proximal layer. But, a part of scattered light proceeds toward the in-plane direction perpendicular to the direction of the incident light. In the conventional photoelectrodes, this light scattered toward the in-plane direction left the photoelectrode straight and could not be utilized effectively. In accordance with the first present invention, since the side faces of the proximal layer are covered with the distal layer which is likely to scatter light, the scattered light toward the in-plane direction is scattered at the side faces of the proximal layer and returned back into the proximal layer again. Accordingly, in accordance with the first present invention, it is possible to confine light efficiently and improve the utilization efficiency of light.

1-1-1. Conductive Substrate

The conductive substrate has, for example, a support substrate and a conductive layer formed thereon. In the first embodiment, since light generally enters from the conductive substrate side, the support substrate and the conductive layer generally have translucency. The support substrate is formed of a glass substrate or a plastic substrate and its thickness is not particularly limited as long as it can impart proper strength to the photoelectrode. Examples of the conductive layer include films of conductive materials such as ITO (indium tin oxide), $SnO_2$, ZnO and the like. The conductive layer is formed by a normal method and its layer thickness of about 0.1 μm to 5 μm is proper.

1-1-2. Semiconductor Layer

The semiconductor layer is composed of a plurality of layers, the plurality of layers being different in an average particle diameter of its semiconductor particles from one another.

As a semiconductor particle, any kind of particle may be used as long as it is generally used in photoelectric conversion materials, and examples of the semiconductor particles include simple-compounds such as titanium oxide, zinc oxide, tin oxide, niobium oxide, zirconium oxide, cerium oxide, tungsten oxide, silicon oxide, aluminum oxide, nickel oxide, barium titanate, strontium titanate, cadmium sulfide, $CuAlO_2$ and $SrCu_2O_2$, or combinations thereof. Titanium oxide is preferred from the viewpoint of stability and safety. This titanium oxide includes various narrowly defined titanium oxides such as anatase type titanium oxide, rutile type titanium dioxide, amorphous titanium oxide, metatitanic acid and orthotitanic acid, and titanium hydroxide and hydrated titanium oxide.

An average particle diameter of semiconductor particles can be generally determined by dispersing the semiconductor particles in a solvent such as water and alcohol to prepare a colloidal solution and analyzing dynamic light scattering of laser light with a light scattering measuring apparatus (manufactured by OTSUKA ELECTRONICS Co., Ltd.).

"A plurality of layers" includes a distal layer placed at a location farther from the substrate and a proximal layer placed at a location closer to the substrate. The distal layer does not need to be adjacent to the proximal layer. For example, when three layers are formed on the conductive substrate, a layer closest to the substrate may be designated as a proximal layer and a layer farthest away from the substrate may be designated as a distal layer. The distal layer and the proximal layer are preferably in porous film forms. And, an average particle diameter of semiconductor particles contained in the distal layer is larger than that of semiconductor particles contained in the proximal layer. The average particle diameter of semiconductor particles contained in the distal layer is preferably 100 nm or more. The reason for this is that in this case, the distal layer can exert adequately an effect of scattering light. And, the average particle diameter of semiconductor particles contained in the proximal layer is preferably 50 nm or less. The reason for this is that in this case, the proximal layer has an adequately high effect of absorbing light.

And, the average particle diameter of semiconductor particles contained in the distal layer is preferably larger than that in the proximal layer by 10 nm or more, more preferably by 20 nm or more, more preferably by 30 nm or more, more preferably by 40 nm or more, and more preferably by 50 nm or more.

The proximal layer and the distal layer preferably take a structure in which the respective side faces of these layers are inclined toward the direction perpendicular to a principal plane of the conductive substrate as shown in FIGS. 1A to 1E and 2A to 2E. The reason for this is that in this structure, (1) the formation of the distal layer covering the side faces of the proximal layer is easy, (2) this shape (parabolic type) is likely to catch the incident light, and (3) an electrolyte is likely to permeate compared with the case where the cross sections of the proximal layer and the distal layer are rectangular. In consideration of the permeation of an electrolyte, such a structure as FIG. 1E may be employed.

The distal layer covers at least a part of side faces of the proximal layer. The "side face" refers to faces other than a contact face of the semiconductor layer and the conductive substrate or a face substantially parallel to the contact face. Specifically, the "side face" refers to, for example, a face which forms the prescribed angle (e.g., 45°) or higher angle with the foregoing contact face. A percentage of an area where the distal layer covers the side faces of the proximal layer is preferably 20% or more, more preferably 50% or more, and furthermore preferably 80% or more. The reason for this percentage is that even if the percentage of an area covered is about 20%, the present invention presents the effect, and if the percentage of an area covered is 50% or more or 80% or more, the present invention presents the effect to a higher degree.

Next, an example of a method of forming the semiconductor layer (the proximal layer and the distal layer) will be described. The semiconductor layer can be formed, for example, by a method of applying a suspension containing semiconductor particles onto a conductive substrate and drying and/or baking the suspension. Hereinafter, this method will be described in more detail.

First, a proximal layer is formed on a conductive substrate. Specifically, first, semiconductor particles to be used for forming the proximal layer are suspended in an appropriate solvent. Examples of such a solvent include glyme solvents such as ethylene glycol monomethyl ether, alcohols such as isopropyl alcohol, alcohol mixed solvents such as isopropyl alcohol/toluene, and water. A method of applying a suspension of semiconductor particles to the substrate for the formation of the proximal layer includes publicly known methods such as a doctor blade method, a squeegee method, a spin coating method and a screen printing method. Then, the applied suspension is dried and baked. Temperature, time, and atmosphere necessary for drying and baking can be appropriately adjusted in accordance with species of a substrate and a semiconductor particle to be used, and for example, drying and baking are performed at a temperature of about 50 to 800° C. for 10 seconds to 12 hours in the atmosphere or in an atmosphere of inert gas. Drying and baking may be done only once at a single temperature or may be done twice or more at different temperatures. When the proximal layer is formed of a plurality of layers, suspensions, which are different in an average particle diameter of semiconductor particles in a suspension from one another, are prepared and the steps of applying, drying and baking may be repeated twice or more.

The thickness of the proximal layer is not particularly limited and it includes, for example, a thickness of about 0.1 to 100 μm. And, from another viewpoint, the proximal layer preferably has a large surface area and it preferably has, for example, a surface area of about 10 to 200 $m^2/g$.

Next, a distal layer covering at least a part of side faces of the proximal layer is formed. Specifically, first, a Kapton tape or a mending tape is stuck to the outside of the periphery of the proximal layer prepared in the above-mentioned step leaving a space between the tape and the proximal layer to prepare an outer frame of a semiconductor layer to be applied. Next, each of suspensions different in an average particle diameter of semiconductor particles in a suspension from one another was added dropwise to the space between the tape and the proximal layer and to the entire proximal layer and the suspension was applied by a doctor blade method. If screen printing is employed, a suspension may be applied preparing a screen mask which is larger than a screen mask having used for forming the proximal layer. Then, the applied suspension is dried and baked as with the formation of the proximal layer.

1-1-3. Sensitizing Dye

A sensitizing dye is preferably adsorbed on the semiconductor layer. As the sensitizing dye, various sensitizing dye having absorption in a visible light region and/or an infrared region can be used. Examples of organic dyes include azo dyes, quinine dyes, quinone imine dyes, quinacridone dyes, squarylium dyes, cyanine dyes, merocyanine dyes, triphenylmethane dyes, xanthene dyes, porphyrin dyes, perylene dyes, Indigo dyes, and naphthalocyanine dyes. In the case of metal complex dye, metals such as Cu, Ni, Fe, Co, V, Sn, Si, Ti, Ge, Cr, Zn, Ru, Mg, Al, Pb, Mn, In, Mo, Y, Zr, Nb, Sb, La, W, Pt, Ta, Ir, Pd, Os, Ga, Tb, Eu, Rb, Bi, Se, As, Sc, Ag, Cd, Hf, Re, Au, Ac, Tc, Te and Rh are used, and phthalocyanine dyes and ruthenium bipyridine dyes are preferably used.

Ruthenium bipyridine dyes are more preferred among the foregoing sensitizing dyes, and particularly Ruthenium535 dye, Ruthenium535-bisTBA dye, and Ruthenium620-1H3TBA dye are preferred.

In the present invention, compounds having an interlock group such as a carboxyl group, an alkoxy group, a hydroxyl group, a sulfonic acid group, an ester group, a mercapto group and a phosphonyl group in a dye molecule are required for adsorbing dye on the semiconductor. Treatment to activate the surface of the semiconductor may be applied as required prior to adsorbing the sensitizing dye on the surface of the semiconductor. In the step of adsorbing the sensitizing dye on the semiconductor, the sensitizing dye is adsorbed on the surface of the semiconductor by immersing the semiconductor in liquid containing the sensitizing dye. The foregoing liquid may be one which dissolve a sensitizing dye to be used and specifically organic solvents such as alcohol, toluene, acetonitrile, THF (tetrahydrofuran), chloroform and dimethylformamide. Generally, a purified solvent is preferably used as the foregoing solvent. The concentration of dye in a solvent can be adjusted in accordance with the species of a dye or a solvent to be used or the conditions for the step of adsorbing dye. The concentration of dye is preferably $1 \times 10^{-5}$ mol/liter or more.

In the step of immersing the semiconductor in liquid containing the sensitizing dye, temperature, pressure, and immersion time can be modified as required. Immersion may be conducted once or twice or more. And, drying may be appropriately performed after the immersion step. The dye adsorbed on the semiconductor by the method described above functions as a photosensitizer transferring an electron to a semiconductor by optical energy. Generally, the dye is secured to the semiconductor through an interlock group. The interlock group provides an electrical bond to facilitate an electron transfer between a dye in an excited state and a conduction band of a semiconductor.

1-2. Second Embodiment

In the photoelectrode of the second embodiment, an average particle diameter of semiconductor particles contained in the distal layer is smaller than that of semiconductor particles contained in the proximal layer.

In the second embodiment, light generally enters from the opposite side of a conductive substrate (i.e., a distal layer side) and a part of the light is absorbed in the distal layer and the rest of the light passes through the distal layer and reaches the proximal layer. The proximal layer is likely to scatter incident light since it contains semiconductor particles having a larger average particle diameter. Therefore, most of the light having entered the proximal layer is scattered and returned back to the distal layer. But, a part of scattered light proceeds toward the in-plane direction perpendicular to the direction of the incident light. In the conventional photoelectrodes, this light scattered toward the in-plane direction left the photoelectrode straight and could not be utilized effectively. In accordance with the second embodiment, the side faces of the proximal layer are covered with the distal layer containing semiconductor particles having a smaller average particle diameter (that is, absorbing incident light efficiently). Therefore, the scattered light toward the in-plane direction is absorbed efficiently in the distal, layer covering the side faces of the proximal layer. Accordingly, in accordance with the second present invention, it is possible to absorb light efficiently and improve the utilization efficiency of light.

1-2-1. Conductive Substrate

The descriptions in the first embodiment basically hold true for the second embodiment. However, in the second embodiment, since light generally enters from the opposite side of the conductive substrate, the support substrate and the conductive layer does not need to have translucency in this case. Accordingly, in the second embodiment, a metal substrate can also be used as a support substrate and a transparent conductive layer having a larger layer thickness or a grid electrode can also be used as a conductive layer.

1-2-2. Semiconductor Layer

A semiconductor layer of the second embodiment is basically similar to that of the first embodiment except that in the second embodiment, an average particle diameter of semiconductor particles contained in the distal layer is smaller than an average particle diameter of semiconductor particles contained in the proximal layer. Therefore, the descriptions in the first embodiment basically hold true for the second embodiment.

Further, in the second embodiment, the average particle diameter of semiconductor particles contained in the distal layer is preferably 50 nm or less. The reason for this is that in this case, the distal layer has an adequately high effect of absorbing light at the side faces of the proximal layer. And, the average particle diameter of semiconductor particles contained in the proximal layer is preferably 100 nm or more. The reason for this is that in this case, the proximal layer has an adequately high effect of scattering light.

And, the average particle diameter of semiconductor particles contained in the proximal layer is preferably larger than that in the distal layer by 10 nm or more, more preferably by 20 nm or more, more preferably by 30 nm or more, more preferably by 40 nm or more, and more preferably by 50 nm or more.

1-2-3. Sensitizing Dye

The same sensitizing dye as the first embodiment can also be used in the second embodiment, and the descriptions in the first embodiment basically hold true for the second embodiment.

2. Dye-Sensitized Solar Cell

A dye-sensitized solar cell of the present invention includes the photoelectrode described above and more specifically it includes the photoelectrode described above, a counter electrode opposed to this photoelectrode, and a carrier transport layer sandwiched between these two electrodes.

Figure 3:
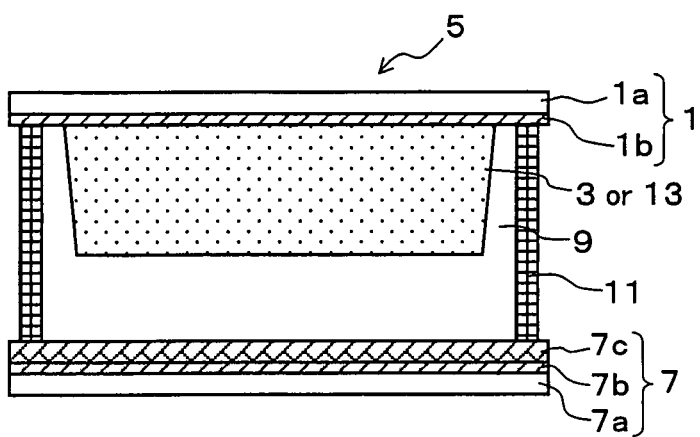
FIG. 3 is a sectional view showing the structure of a dye-sensitized solar cell of the present invention.

First, by use of FIG. 3, a specific structure of the dye-sensitized solar cell of the present invention will be exemplified. FIG. 3 is just an exemplification and the scope of the present invention is not limited to the structure of FIG. 3. Referring to FIG. 3, the dye-sensitized solar cell of the present invention includes a photoelectrode 5, a counter electrode 7 opposed to this photoelectrode 5, and a carrier transport layer 9 sandwiched between these two electrodes. The photoelectrode 5 has a conductive substrate 1 and a semiconductor layer 3 or 13. The conductive substrate 1 includes a support substrate 1a and a conductive layer 1b. The semiconductor layer 3 or 13 has a plurality of layers containing a proximal layer and a distal layer. The counter electrode 7 has a support substrate 7a, and a conductive layer 7b and a catalyst layer 7c which are formed sequentially thereon. The photoelectrode 5 and the counter electrode 7 are placed at a prescribed space interposing spacers 11 between these two electrodes. Light enters from the photoelectrode 5 side or the counter electrode 7 side.

2-1. Counter Electrode

The counter electrode has, for example, a support substrate, and a conductive layer and a catalyst layer which are formed sequentially thereon. When light enters from the photoelectrode side, the counter electrode does not need to have translucency, and when light enters from the counter electrode side, the counter electrode generally needs to have translucency (hence, the support substrate and the conductive layer having translucency are used). The support substrate is formed of a glass substrate, a plastic substrate or the like and its thickness is not particularly limited as long as it can impart proper strength to the photoelectrode. The conductive layer can be formed from, for example, n-type or p-type element semiconductors (e.g., silicon, germanium, etc.) or compound semiconductors (e.g., GaAs, InP, ZnSe, CsS, etc.); metals such as gold, platinum, silver, copper, aluminum and the like; high melting point metals such as titanium, tantalum, tungsten and the like; and transparent conductive materials such as ITO (indium tin oxide), $SnO_2$, CuI, ZnO and the like. These conductive layers are formed by a normal method and their layer thicknesses of about 0.1 μm to 5 μm are proper.

A material of the catalyst layer can be selected from platinum, carbon black, Ketjenblack, carbon nanotube, and fullerene. When platinum is selected, examples of the catalyst layer include a catalyst layer in which a platinum film is formed on the support substrate coated with a conductive layer by a method such as sputtering, thermal decomposition of platinic chloride, electrodeposition or the like. An example of a film thickness of platinum film in this case includes about 1 nm to 100 nm. When the electrical conductivity of the catalyst layer is high, the conductive layer is unnecessary.

2-2. Carrier Transport Layer

As a carrier transport layer used in the present invention, any kind of substance may be used as long as it can transport an electron, a hole, or an ion. Specifically, ionic conductors such as a liquid electrolyte and a polymer electrolyte can be employed. As a ionic conductor, a redox material is better, and it is not particularly limited as long as it is an electrolyte which can be generally used in a battery or a solar cell, and includes, specifically, combinations of metal iodide such as LiI, NaI, KI or $CaI_2$ and iodine, and combinations of metal bromide such as LiBr, NaBr, KBr or $CaBr_2$ and bromine. Among others, a combination of LiI and iodine is preferred.

Nitrogen-containing aromatic compounds such as tert-butylpyridine (TBP), or imidazole salts such as DMPII, MPII, EMII and HMII may be added as an additive hitherto used.

The concentration of electrolyte is suitably 0.01 to 1.5 mol/liter and preferably 0.1 to 0.7 mol/liter.

3. Dye-sensitized Solar Cell Module

A dye-sensitized solar cell module of the present invention has a conductive substrate and plural semiconductor layers formed on the conductive substrate, being formed of semiconductor particles, at least one of the plural semiconductor layers having a plurality of layers, the plurality of layers being different in an average particle diameter of semiconductor particles from one another, a distal layer of the plurality of layers, placed at a location farther from the substrate, covering at least a part of side faces of a proximal layer of the plurality of layers, placed at a location closer to the substrate.

For example in this structure, when solar cells are connected in series, optical absorption by an electrolyte, an insulating layer for insulating between adjacent solar cells, or a connecting layer for conduction of electricity between the counter electrode and the conductive substrate exists. Therefore, it is preferred to arrange semiconductor particles having different particle diameters in the semiconductor layers and absorb all of the light having entered once without dissipating the light from the semiconductor layer.

Hereinafter, the present invention will be described in more detail by way of the following examples, but the present invention is not limited to these examples.

EXAMPLE 1

Figure 4:
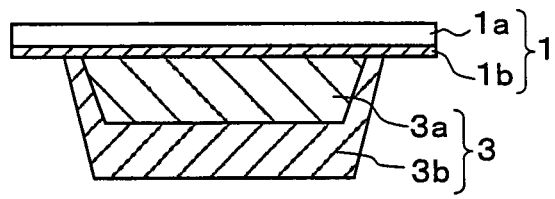
FIG. 4 is a sectional view showing the structure of a photoelectrode (two-layer structure) of Example 1 of the present invention.

FIG. 4 is a sectional view showing the structure of a photoelectrode of Example 1 of the present invention. The photoelectrode of this example has a conductive substrate 1 and a semiconductor layer 3 of semiconductor particles, which is formed on the conductive substrate 1. The conductive substrate 1 has a support substrate 1a and a conductive layer 1b formed thereon. The semiconductor layer 3 has a proximal layer 3a and a distal layer 3b, and an average particle diameter of semiconductor particles contained in the distal layer 3b is larger than that of semiconductor particles contained in the proximal layer 3a.

This photoelectrode was prepared by following the procedure described below. By use of this photoelectrode, a dye-sensitized solar cell on the scale of 10 mm×10 mm, having a structure similar to that in FIG. 3, was prepared.

1. Conductive Substrate

A conductive substrate (thickness; 1.1 mm, produced by Nippon Sheet Glass Co., Ltd.) 1, in which a fluorine-doped $SnO_2$ conductive layer 1b (a layer thickness; 520 nm) was formed on a glass substrate 1a as a support substrate, was prepared.

2. Preparation of Semiconductor Layer

Next, a semiconductor layer 3 was formed on the conductive substrate 1 following the procedure described below.

2-1. Preparation of Suspension of Semiconductor Particle 125 ml of titanium isopropoxide (produced by KISHIDA CHEMICAL Co., Ltd.) and 750 ml of a 0.1 M aqueous solution of nitric acid (produced by KISHIDA CHEMICAL Co., Ltd.) which is a pH regulator were mixed and the resulting mixture was heated to 80° C. and kept at this temperature for 8 hours to allow a hydrolysis reaction of titanium isopropoxide to proceed to prepare a sol solution. Next, the sol solution was kept at 230° C. for 11 hours in a titanium autoclave to allow particles to grow. Next, a colloidal solution I containing $TiO_2$ particles having an average particle diameter of 15 nm was prepared by performing ultrasonic dispersing for 30 minutes, and a twofold amount of ethanol was added to the colloidal solution I and the mixture was centrifuged at 5000 rpm to prepare titanium oxide particles. Incidentally, an average particle diameter of $TiO_2$ particles contained in the colloidal solution was determined by using a light scattering measuring apparatus (manufactured by OTSUKA ELECTRONICS Co., Ltd.) and analyzing dynamic light scattering of laser light.

Next, a colloidal solution (hereinafter, referred to as a colloidal solution II) containing $TiO_2$ particles (particle growth conditions: 200° C. and 13 hours, anatase, hereinafter, referred to as P2) having an average particle diameter of 105 nm and a colloidal solution (hereinafter, referred to as a colloidal solution III) containing $TiO_2$ particles (particle growth conditions: 210° C. and 17 hours, anatase, hereinafter, referred to as P3) having an average particle diameter of 310 nm were prepared by following the same procedure as in the above-mentioned colloidal solution I except for changing the reaction conditions in the autoclave. Further, the above colloidal solution I and the above colloidal solution II were mixed in the proportions of 90:10 by weight to prepare a colloidal solution A and in the proportions of 80:20 by weight to prepare a colloidal solution B, and the above colloidal solution I and the above colloidal solution III were mixed in the proportions of 90:10 by weight to prepare a colloidal solution C and in the proportions of 80:20 by weight to prepare a colloidal solution D.

Examples of a solvent to be used for suspending these semiconductor particles to prepare paste include glyme solvents such as ethylene glycol monomethyl ether, alcohol solvents such as isopropyl alcohol, mixed solvents such as isopropyl alcohol/toluene, and water. Specifically, paste can be prepared by the steps described below.

Titanium oxide particle prepared by the above-mentioned step was cleaned and a solution formed by dissolving ethyl cellulose (produced by KISHIDA CHEMICAL Co., Ltd.) and terpineol (produced by KISHIDA CHEMICAL Co., Ltd.) in absolute ethanol was added and the mixture was stirred to disperse the titanium oxide particle. Then, ethanol of the resulting dispersion was evaporated at 50° C. in a vacuum of 40 mbar to make titanium oxide paste (suspensions I to III and suspensions A to D) from the colloidal solutions I to III and the colloidal solutions A to D. The concentration of the paste was adjusted in such a way that the solid content of titanium oxide was 20% by weight, the content of ethyl cellulose was 10% by weight and the content of terpineol was 64% by weight as final composition.

2-2. Measurement of Average Particle Diameter of Semiconductor Particles

In order to measure an average particle diameter of the semiconductor particles, each of the above-mentioned suspensions I to III and A to D was applied onto a $SnO_2$ conductive layer 1b by a doctor blade method and then dried. Then, the applied suspension was baked at 450° C. for 30 minutes in the atmosphere to form a semiconductor layer. With respect to these photoelectrodes, a half width of a peak at a diffraction angle of 25.28° angle (corresponding to an anatase 101 plane) in θ/2θ measurement was determined with an X-ray diffraction apparatus and an average particle diameter was derived from the half width value and a Scherrer equation. The results are shown in Table 1.

TABLE 1

| Suspension | I | II | III | A | B | C | D |
|---|---|---|---|---|---|---|---|
| Average particle diameter (nm) | 14.2 | 115 | 299 | 23.7 | 32.9 | 40.1 | 71.2 |

2-3. Application and Baking of Suspension of Semiconductor Particle

Next, a mending tape (produced by Sumitomo 3M Limited, type 810-3-24) was stuck on a $SnO_2$ conductive layer 1b so as to form an opening of 9.5 mm×9.5 mm, and the above-mentioned suspension I was applied by a doctor blade method and then dried. Then, the applied suspension was baked at 450° C. for 30 minutes in the atmosphere to form a proximal layer 3a.

Next, a mending tape was stuck to the outside of the periphery of the proximal layer 3a leaving a 1 mm space between the tape and the proximal layer to prepare an outer frame for forming a distal layer 3b. Next, a suspension A was added dropwise to an opening in an adequate amount, and the suspension was applied by a doctor blade method and then dried. Then, the applied suspension was baked at 450° C. for 30 minutes in the atmosphere to form a distal layer to prepare a photoelectrode not containing a sensitizing dye (a layer thickness; 15 μm, a size; 10 mm×10 mm).

3. Adsorption of Sensitizing Dye on Photoelectrode

A sensitizing dye was adsorbed on the semiconductor layer 3 in a manner described below. First, Ruthenium535-bisTBA dye (produced by Solaronix S.A.) was used as a sensitizing dye and an ethanol solution (a concentration of the sensitizing dye; $4\times10^{-4}$ mol/liter) of this dye was prepared. Next, the photoelectrode obtained in the above-mentioned step was immersed in this solution and left standing at 80° C. for 20 hours. Thereby, the inside of the photoelectrode adsorbed the sensitizing dye in an amount of about $7\times10^{-8}$ mol/cm². Then, the photoelectrode was cleaned with ethanol (produced by Aldrich Chemical Company) and dried to absorb the sensitizing dye on the photoelectrode.

4. Preparation of Solar Cell

Next, by use of the photoelectrode obtained in the above-mentioned step, a solar cell having a structure shown in FIG. 3 was prepared. The specific steps are as follows.

4-1. Preparation of Electrolyte

An oxidation-reduction electrolyte to be used as a carrier transport layer 9 of FIG. 3 was prepared by dissolving DMPII with a concentration of 0.6 mol/liter (produced by SHIKOKU CHEMICALS CORPORATION), lithium iodide with a concentration of 0.1 mol/liter (produced by Aldrich Chemical Company), iodine with a concentration of 0.05 mol/liter (produced by Aldrich Chemical Company) and TBP with a concentration of 0.5 mol/liter (produced by Aldrich Chemical Company) in acetonitrile (produced by Aldrich Chemical Company).

4-2. Preparation of Counter Electrode and Filling of Electrolyte

A counter electrode 7 having the same shape and size as the photoelectrode 5 was formed by forming a Pt film (thickness of Pt thin film; 3000 nm) as a catalyst layer 7c by sputtering on a transparent conductive substrate, in which a conductive layer 7b is formed on a glass substrate 7a. A spacer 11 (produced by DuPont-Mitsui Polychemicals Co., Ltd., trade name:"HIMILAN", a film thickness 30 μm) having a configuration adapted to a size of the conductive substrate 1 of the photoelectrode 5 was prepared in such a way that the dimension of an outer frame is 17 mm×17 mm and an opening is 12 mm×12 mm, and the photoelectrode 5 and the counter electrode 7 are placed on opposite sides of the spacer 11 as shown in FIG. 3 and the above-mentioned electrolyte was filled into the inside to complete a dye-sensitized solar cell.

EXAMPLE 2

Figure 5A:
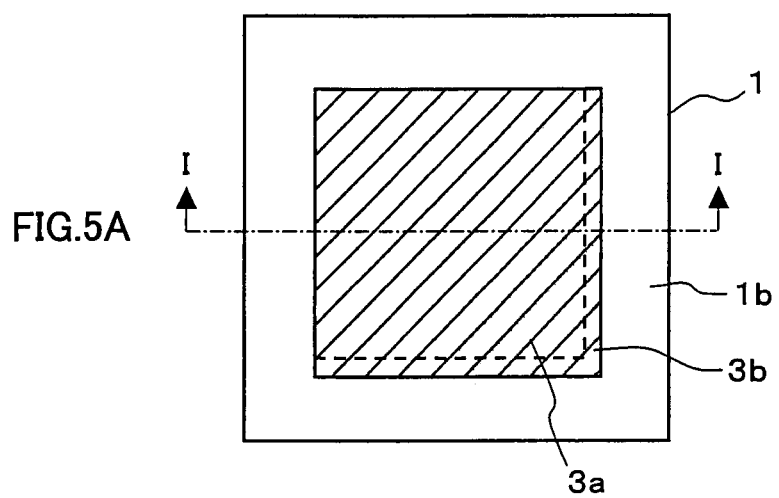
FIGS. 5A and 5B are a plan view and a sectional view respectively, each showing the structure of a photoelectrode (two-layer structure) of Example 2 of the present invention.
Figure 5B:
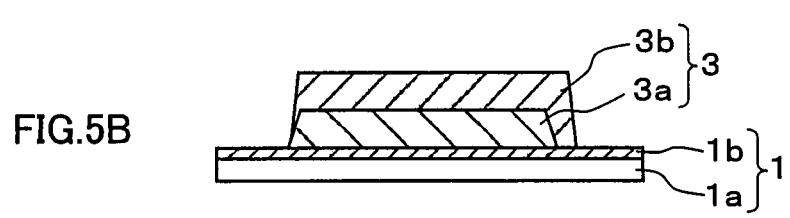

A photoelectrode shown in FIGS. 5A and 5B was prepared by following the same procedure as in Example 1 except for forming a semiconductor layer 3 as shown below and then a solar cell having a constitution similar to the dye-sensitized solar cell shown in FIG. 3 was prepared by the same method as in Example 1. In addition, FIGS. 5A and 5B shows the structure of a photoelectrode of Example 2, and FIG. 5A is a plan view viewed from the semiconductor layer 3 side and FIG. 5B is a sectional view.

1. Formation of Semiconductor Layer

A mending tape was stuck to the outside of the periphery of the proximal layer 3a formed on the conductive substrate 1 leaving a 1 mm space between the tape and the proximal layer 3a for two adjacent sides of a square semiconductor layer and without leaving a space between the tape and the proximal layer 3a for the rest two adjacent sides to prepare an outer frame for forming a distal layer 3b on the conductive substrate 1. Next, a suspension A was added dropwise to a space between the tape and the proximal layer 3a and to the entire proximal layer 3a, and the suspension was applied by a doctor blade method and then dried. Then, the applied suspension was baked at 450° C. for 30 minutes in the atmosphere to form a distal layer 3b to prepare a photoelectrode not containing a sensitizing dye (a layer thickness; 15 µm, a size; 9 mm×9 mm).

EXAMPLE 3

Figure 6:
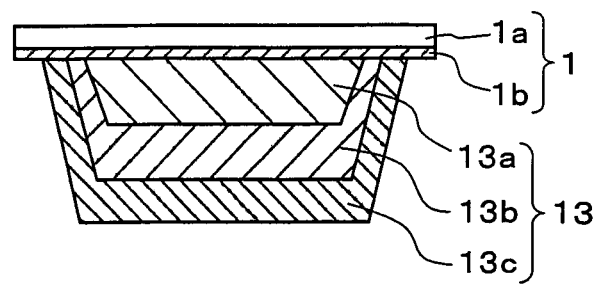
FIG. 6 is a sectional view showing the structure of a photoelectrode (three-layer structure) of Example 3 of the present invention.

FIG. 6 is a sectional view showing the structure of a photoelectrode of Example 3. The photoelectrode of this example includes a semiconductor layer 13 having three layers. The semiconductor layer 13 has a first, a second and a third layers 13a, 13b and 13c. The first layer 13a and the second layer 13b of these layers correspond to the proximal layer 3a and the distal layer 3b, respectively, in Example 1. As for a production method of the photoelectrode of Example 3, the steps through forming the second layer 13b were similar to the steps through forming the distal layer 3b in Example 1. The third layer 13c was formed in the manner described below. Then, a solar cell having a constitution similar to the dye-sensitized solar cell shown in FIG. 3 was prepared by the same method as in Example 1.

1. Formation of Third Layer

A mending tape was stuck to the outside of the periphery of the second layer 13b formed on the conductive substrate 1 leaving a 1 mm space between the tape and the second layer 13b to prepare an outer frame for forming a third layer 13c. Next, a suspension B was added dropwise to an opening in an adequate amount, and the suspension was applied by a doctor blade method and then dried. Then, the applied suspension was baked at 450° C. for 30 minutes in the atmosphere to form a third layer 13c to prepare a photoelectrode not containing a sensitizing dye (a layer thickness; 21 µm, a size; 10 mm×10 mm).

EXAMPLE 4

Figure 7:
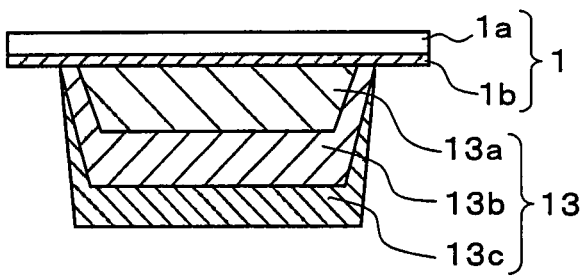
FIG. 7 is a sectional view showing the structure of a photoelectrode (three-layer structure) of Example 4 of the present invention.

FIG. 7 is a sectional view showing the structure of a photoelectrode of Example 4. A production method of the photoelectrode of Example 4 is similar to that of Example 3 except for a method of forming a third layer 13c. The third layer 13c was formed in the manner described below. Then, a solar cell having a constitution similar to the dye-sensitized solar cell shown in FIG. 3 was prepared by the same method as in Example 1.

1. Formation of Third Layer

A mending tape was stuck to the outside of the periphery of the second layer 13b formed on the conductive substrate 1 without leaving a space between the tape and the second layer 13b to prepare an outer frame for forming a third layer 13c. Next, a suspension III was added dropwise to a space between the tape and the second layer 13b and to the entire second layer 13b, and the suspension was applied by a doctor blade method and then dried. Then, the applied suspension was baked at 450° C. for 30 minutes in the atmosphere to form a third layer 13c to prepare a photoelectrode not containing a sensitizing dye (a layer thickness; 21 µm, a size; 10 mm×10 mm).

EXAMPLE 5

The structure of a photoelectrode of Example 5 is shown in FIG. 6. The structure of the photoelectrode of Example 5 is similar to that of Example 3, but species of a suspension to be used for forming a first, a second and a third layers 13a, 13b and 13c is different from Example 3. The first, the second and the third layers 13a, 13b and 13c were formed in the manner described below in this example, and then, a solar cell having a constitution similar to the dye-sensitized solar cell shown in FIG. 3 was prepared by the same method as in Example 1. However, in this example, a thickness of a Pt layer as a catalyst layer 7c was taken as 5 nm. As for the solar cells prepared in Examples 1 to 4, light enters from a conductive substrate 1 side, but as for the solar cell of this example, light enters from the opposite side of the conductive substrate 1. Therefore, the average particle diameter of semiconductor particles in the first, the second and the third layers 13a, 13b and 13c of the semiconductor layer 3 prepared in this example was decreased in this order.

1. Formation of Semiconductor Layer

The above-mentioned suspension II was applied onto a $SnO_2$ conductive layer 1b by a doctor blade method and then dried. Then, the applied suspension was baked at 450° C. for 30 minutes in the atmosphere to form a first layer 13a.

Next, a mending tape was stuck to the outside of the periphery of the first layer 13a leaving a 1 mm space between the tape and the first layer 13a to prepare an outer frame for forming a second layer 13b.

Next, a suspension C was added dropwise to a space between the tape and the first layer 13a and to the entire first layer 13a, and the suspension was applied by a doctor blade method and then dried. Then, the applied suspension was baked at 450° C. for 30 minutes in the atmosphere to form a second layer 13b.

Further, a mending tape was stuck to the outside of the periphery of the second layer 13b leaving a 1 mm space between the tape and the second layer 13b to prepare an outer frame for forming a third layer 13c. Next, a suspension I was added dropwise to a space between the tape and the second layer 13b and to the entire second layer 13b, and the suspension was applied by a doctor blade method and then dried. Then, the applied suspension was baked at 450° C. for 30 minutes in the atmosphere to form a third layer 13c to prepare a photoelectrode not containing a sensitizing dye (a layer thickness; 22 µm, a size; 10 mm×10 mm).

EXAMPLE 6

Figure 8:
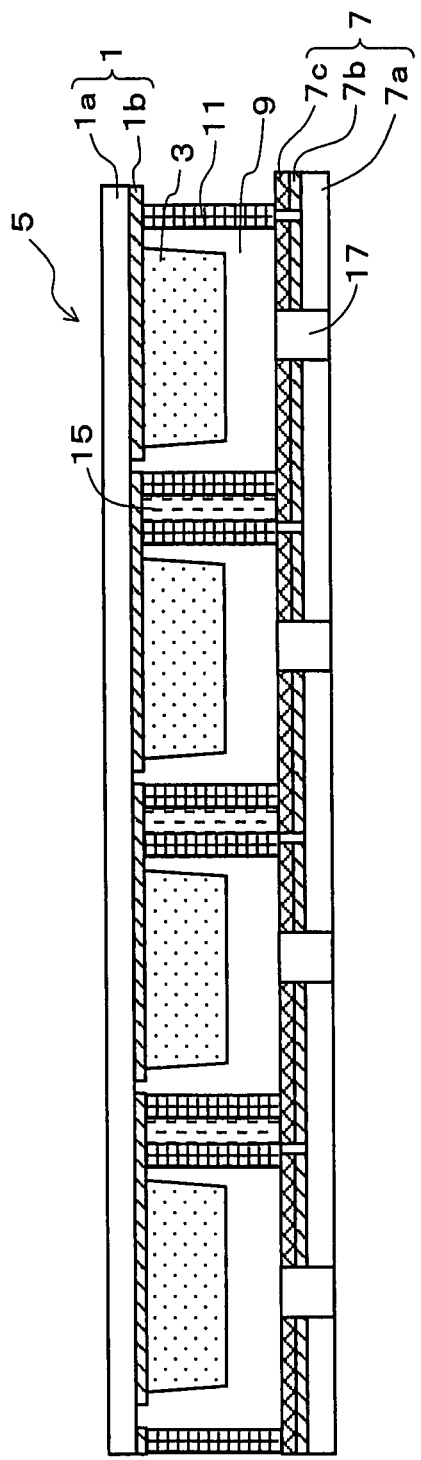
FIG. 8 is a sectional view showing the structure of a dye-sensitized solar cell module (four cells in series) of Example 6 of the present invention.

FIG. 8 is a sectional view showing the structure of a dye-sensitized solar cell module of Example 6. This solar cell module includes a photoelectrode 5 similar to Example 1 and plural semiconductor layers 3 are arranged on the same conductive substrate 1. And, in this solar cell module, four unit cells are integrated by connecting them in series.

Hereinafter, a fabrication process of this dye-sensitized solar cell module will be described.

A 10 cm×10 cm glass substrate 1a with $SnO_2$ produced by Nippon Sheet Glass Co., Ltd. was used as a conductive substrate 1 (a transparent conductive layer 1b=fluorine-doped $SnO_2$). The $SnO_2$ layer 1b was patterned in strip form in such a way that a pitch of a unit cell is 1.035 cm and a space between adjacent unit cells is 350 μm by irradiating laser light (YAG laser) to the $SnO_2$ layer to evaporate $SnO_2$.

A semiconductor layer 3 was formed on the foregoing substrate 1 by the same method as in Example 1 to prepare a photoelectrode not containing a sensitizing dye. The photoelectrode was adapted in such a way that a size of the semiconductor layer 3 of the unit cell is 10 mm in width, 90 mm in length, and 15 μm in film thickness and 1 mm was employed as a space of patterning of a screen plate used in printing.

Next, a dye was adsorbed on the semiconductor layer 3 in a manner described below. First, Ruthenium535-bisTBA dye (produced by Solaronix S.A.) was used as a sensitizing dye and an ethanol solution (a concentration of the sensitizing dye; $4\times10^{-4}$ mol/liter) of this dye was prepared. Next, the photoelectrode obtained in the above-mentioned step was immersed in this solution and left standing at 80° C. for 20 hours. Thereby, the inside of the photoelectrode adsorbed the sensitizing dye in an amount of about $7\times10^{-8}$ mol/cm². Then, the photoelectrode was cleaned with ethanol (produced by Aldrich Chemical Company) and dried to absorb the sensitizing dye on the photoelectrode.

Further, a counter electrode was formed by preparing a substrate similar to a patterned substrate 1, and forming a platinum catalyst layer 7c in a film thickness of about 3000 nm on a $SnO_2$ layer 7b so as to form the same pattern as a $SnO_2$ layer 7b on a support substrate 7a.

HIMILAN 1855 produced by DuPont was cut off into pieces of 1 mm×95 mm to be used as an insulating pacer 11, and these pieces were stuck so as to construct the configuration of FIG. 8 and heated for 10 minutes in an oven of about 100° C. to be bonded. Then, a connecting layer 15 was formed by filling commercially available conductive paste (produced by Fujikura Kasei Co., Ltd., trade name "DOTITE") between adjacent insulating pacers 11 through a filling port provided at the support substrate and drying.

An electrolyte was prepared by dissolving DMPII in a concentration of 0.6 mol/liter, lithium iodide in a concentration of 0.1 mol/liter, TBP in a concentration of 0.5 mol/liter and iodine in a concentration of 0.05 mol/liter in acetonitrile of a solvent, and a dye-sensitized solar cell module was prepared by filling the foregoing electrolyte through an electrolyte filling port 17 through a capillary effect and sealing a peripheral portion with an epoxy resin.

EXAMPLE 7

Figure 9:
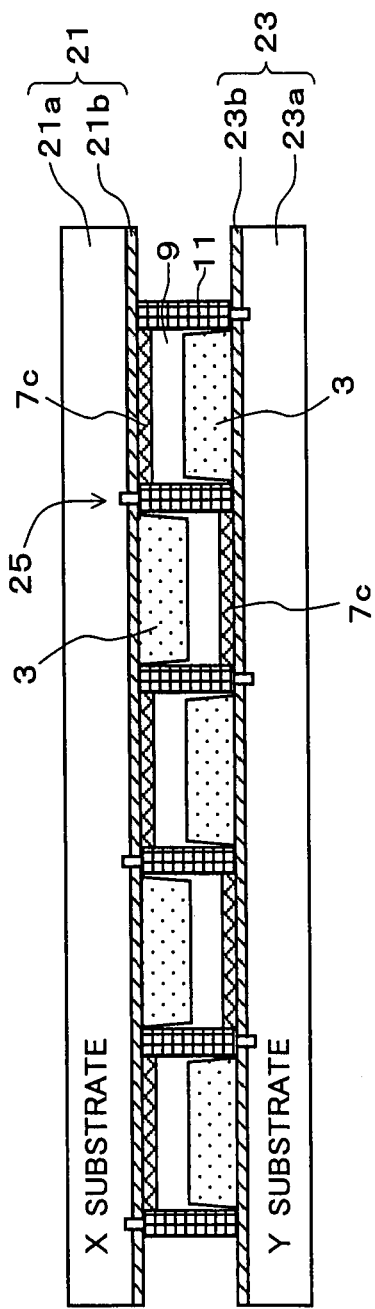
FIG. 9 is a sectional view showing the structure of a dye-sensitized solar cell module (five cells in series) of Example 7 of the present invention.
Figure 10A:
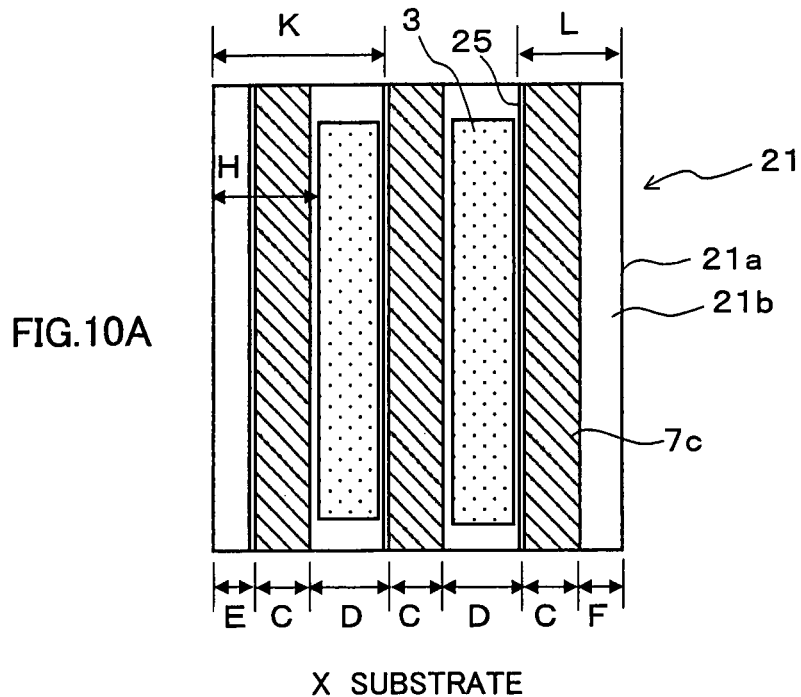
FIGS. 10A and 10B are plan views showing the structure of two conductive constituting a dye-sensitized solar cell module of FIG. 9.
Figure 10B:
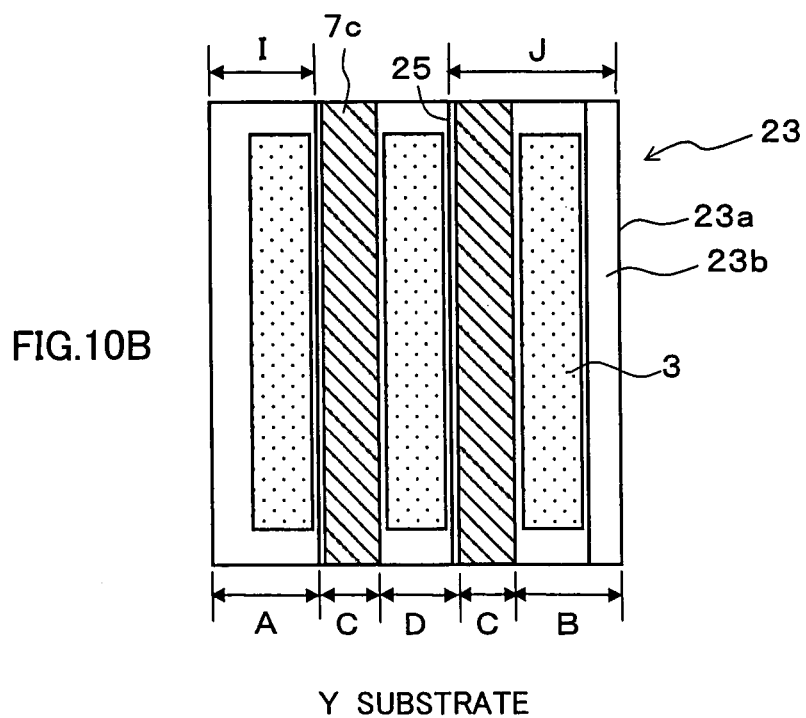

FIG. 9 is a sectional view showing the structure of a dye-sensitized solar cell module of Example 7. FIGS. 10A and 10B are plan views showing the structures of two conductive substrates constituting the solar cell module of FIG. 9.

This dye-sensitized solar cell module is formed by overlaying a conductive substrate 21 in which a semiconductor layer 3 and a catalyst layer 7c are alternately arranged on a similar conductive substrate 23. And, in this solar cell module, five unit cells are integrated by connecting them in series.

Hereinafter, a fabrication process of this dye-sensitized solar cell module will be described.

Two 55 mm×65 mm glass substrates 21a, 23a (X substrate, Y substrate) with a $SnO_2$ conductive layer 21b, 23b produced by Nippon Sheet Glass Co., Ltd. were used as conductive substrates 21, 23. By sputtering, a film of platinum was formed in a film thickness of about 5 nm as a catalyst layer 7c in such a way that A is 15 mm, B is 14 mm, C is 8 mm, D is 10 mm, E is 5 mm and F is 6 mm as shown in FIGS. 10A and 10B.

Next, a semiconductor layer 3 was formed on the conductive layer 21b, 23b so as to be sandwiched between adjacent catalyst layers 7c by the same method as in Example 1, and the semiconductor layer was subjected to leveling at room temperature for 1 hour and dried in an oven of 80° C. and baked in the air of 500° C. to prepare a photoelectrode shown in FIGS. 10A and 10B.

Next, as shown in FIGS. 10A and 10B, a scribe line was formed in such a way that I is 14.5 mm, J is 22.5 mm, K is 22.5 mm, and L is 13.5 mm by irradiating laser light (YAG laser, basic wavelength 1.06 μm) to the $SnO_2$, conductive layers 21b and 23b, to evaporate $SnO_2$.

Next, a dye was adsorbed on the semiconductor layer 3 in a manner described below. First, Ruthenium535-bisTBA dye (produced by Solaronix S.A.) was used as a sensitizing dye and an ethanol solution (a concentration of the sensitizing dye; $4\times10^{-4}$ mol/liter) of this dye was prepared. Next, the photoelectrode was immersed in this solution and left standing at 80° C. for 20 hours. Thereby, the inside of the photoelectrode adsorbed the sensitizing dye in an amount of about $7\times10^{-8}$ mol/cm². Then, the photoelectrode was cleaned with ethanol (produced by Aldrich Chemical Company) and dried to absorb the sensitizing dye on the photoelectrode.

The X substrate 21 and the Y substrate 23 prepared in the above-mentioned step were used as a substrate, and HIMILAN 1855 produced by DuPont was cut off into pieces of 1 mm×60 mm to be used as an insulating layer 11 and these pieces were placed so as to cover a scribe line 25 of each substrate. The X substrate 21 and the Y substrate 23 were stuck so as to construct the configuration of FIG. 9 and heated for 10 minutes in an oven of about 100° C. to be bonded.

An electrolyte A was prepared by dissolving DMPII in a concentration of 0.6 mol/liter, lithium iodide in a concentration of 0.1 mol/liter, TBP in a concentration of 0.5 mol/liter and iodine in a concentration of 0.02 mol/liter in acetonitrile of a solvent, and an electrolyte was prepared by dissolving DMPII in a concentration of 0.8 mol/liter, TBP in a concentration of 0.5 mol/liter and iodine in a concentration of 0.05 mol/liter in acetonitrile. A carrier transport layer 9 was prepared by filling such electrolyte into the dye-sensitized solar cell module prepared in the above-mentioned step through a capillary effect from the direction perpendicular to a surface of this paper and a dye-sensitized solar cell module was prepared by sealing a periphery of the carrier transport layer 9 with an epoxy resin. A Y-substrate 23 side of the dye-sensitized solar cell module prepared was taken as a light receiving plane.

COMPARATIVE EXAMPLE 1

Figure 11:
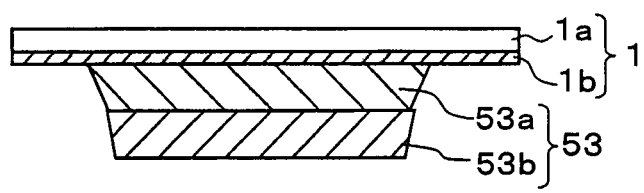
FIG. 11 is a sectional view showing the structure of a photoelectrode (two-layer structure) of Comparative Example 1 of the present invention.

FIG. 11 is a sectional view showing the structure of a photoelectrode of Comparative Example 1. This photoelectrode was prepared by following the same procedure as in Example 1 except for forming a semiconductor layer 53 as shown below and then a solar cell having a constitution similar to the dye-sensitized solar cell shown in FIG. 3 was prepared by the same method as in Example 1.

1. Formation of Semiconductor Layer

A mending tape was stuck to the periphery of the proximal layer 53a formed on the conductive substrate 1 so as to cover a sloped surface of the proximal layer 53a for all of four sides of the proximal layer 53a to prepare an outer frame for forming a distal layer 53b. Next, a suspension A was added dropwise to the entire proximal layer 53a, and the suspension was applied by a doctor blade method and then dried. Then, the applied suspension was baked at 450° C. for 30 minutes in the atmosphere to form a distal layer 53b to prepare a photoelectrode not containing a sensitizing dye (a layer thickness; 13 µm, a size; 10 mm×10 mm).

COMPARATIVE EXAMPLE 2

Figure 12:
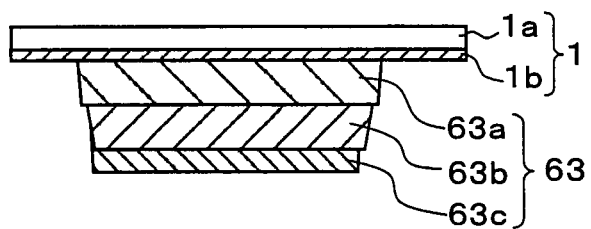
FIG. 12 is a sectional view showing the structure of a photoelectrode (three-layer structure) of Comparative Example 2 of the present invention.

FIG. 12 is a sectional view showing the structure of a photoelectrode of Comparative Example 2. The photoelectrode of this comparative example was prepared by following the same procedure as in Comparative Example 1 except for forming a semiconductor layer 63 as shown below and then a solar cell having a constitution similar to the dye-sensitized solar cell shown in FIG. 3 was prepared by the same method as in Example 1. The photoelectrode of this comparative example includes a semiconductor layer 63 having three layers. The semiconductor layer 63 has a first, a second and a third layers 63a, 63b and 63c. The first layer 63a and the second layer 63b of these layers correspond to the proximal layer 53a and the distal layer 53b, respectively, in Comparative Example 1. As for a production method of the photoelectrode of Comparative Example 2, the steps through forming the second layer 63b were similar to the steps through forming the distal layer 53b in Comparative Example 2. The third layer 63c was formed in the manner described below.

1. Formation of Third Layer

A mending tape was stuck to the outside of the periphery of the second layer 63b formed on the conductive substrate 1 so as to touch the second layer 63b to prepare an outer frame for forming a third layer 63c. Next, a suspension II was added dropwise to the entire second layer 63b, and the suspension was applied by a doctor blade method and then dried. Then, the applied suspension was baked at 450° C. for 30 minutes in the atmosphere to form a third layer 63c to prepare a photoelectrode not containing a sensitizing dye (a layer thickness; 21 µm, a size; 10 mm×10 mm).

COMPARATIVE EXAMPLE 3

The structure of a photoelectrode of Comparative Example 3 is shown in FIG. 12. The structure of the photoelectrode of Comparative Example 3 is similar to that of Comparative Example 2, but species of a suspension to be used for forming a first, a second and a third layers 63a, 63b and 63c is different from Comparative Example 2 (The same species of suspension as Example 5 was used). The first, the second and the third layers 63a, 63b and 63c were formed in the manner described below in this comparative example, and then, a solar cell having a constitution similar to the dye-sensitized solar cell shown in FIG. 3 was prepared by the same method as in Example 5. As for the solar cell of this comparative example, light enters from the opposite side of the conductive substrate 1. Therefore, the average particle diameter of semiconductor particles in the first, the second and the third layers 63a, 63b and 63c of the semiconductor layer 3 prepared in this comparative example was decreased in this order.

The above-mentioned suspension II was applied onto a SnO₂ conductive layer 1b by a doctor blade method and then dried. Then, the applied suspension was baked at 450° C. for 30 minutes in the atmosphere to form a first layer 63a.

Next, a mending tape was stuck to the outside of the periphery of the first layer 63a so as to touch the first layer 63a to prepare an outer frame for forming a second layer 63b. Next, a suspension C was added dropwise to the entire first layer 63a, and the suspension was applied by a doctor blade method and then dried. Then, the applied suspension was baked at 450° C. for 30 minutes in the atmosphere to form a second layer 63b.

Further, a mending tape was stuck to the outside of the periphery of the second layer 63b so as to touch the second layer 63b to prepare an outer frame for forming a third layer 63c. Next, a suspension I was added dropwise to the entire third layer 63c, and the suspension was applied by a doctor blade method and then dried. Then, the applied suspension was baked at 450° C. for 30 minutes in the atmosphere to form a third layer 63c to prepare a photoelectrode not containing a sensitizing dye (a layer thickness; 20 µm, a size; 10 mm×10 mm).

COMPARATIVE EXAMPLE 4

A dye-sensitized solar cell module, shown in FIG. 8, in which four unit cells were integrated by connecting them in series, was prepared using the photoelectrode of Comparative Example 1 by following the same procedure as in Example 6.

COMPARATIVE EXAMPLE 5

A dye-sensitized solar cell module, shown in FIG. 9, in which five unit cells were integrated by connecting them in series, was prepared by following the same procedure as in Example 7 and forming the photoelectrode structure of Comparative Example 2 on the X substrate side and forming the photoelectrode structure of Comparative Example 3 on the Y substrate side Light (AM 1.5 Solar Simulator) with intensity of 1 kW/m² was irradiated to the solar cells obtained in Examples 1 to 7 and Comparative Examples 1 to 5 to measure photoelectric conversion efficiency. The results of measurement are shown in Table 2.

TABLE 2

| | Jsc (mA/cm²) | Voc (V) | FF | Effi. (%) | Notes |
|---|---|---|---|---|---|
| Example 1 | 16.4 | 0.709 | 0.719 | 8.36 | two-layer structure |
| Example 2 | 15.9 | 0.708 | 0.713 | 8.03 | two-layer structure |
| Example 3 | 17.4 | 0.701 | 0.720 | 8.78 | three-layer structure |
| Example 4 | 16.9 | 0.702 | 0.712 | 8.45 | three-layer structure |
| Example 5 | 14.5 | 0.705 | 0.712 | 7.28 | incidence from a catalyst layer side |
| Example 6 | 4.1 | 2.800 | 0.560 | 6.43 | four unit cells in series measured at an effective area |
| Example 7 | 3.4 | 3.525 | 0.600 | 7.19 | five unit cells in series measured at an effective area |
| Comparative Example 1 | 15.1 | 0.711 | 0.701 | 7.53 | two-layer structure |
| Comparative Example 2 | 15.4 | 0.708 | 0.721 | 7.86 | three-layer structure |
| Comparative Example 3 | 12.5 | 0.704 | 0.710 | 6.25 | incidence from a catalyst layer side |
| Comparative Example 4 | 3.6 | 2.810 | 0.559 | 5.65 | four unit cells in series measured at an effective area |

TABLE 2-continued

| | Jsc (mA/cm$^2$) | Voc (V) | FF | Effi. (%) | Notes |
|---|---|---|---|---|---|
| Comparative Example 5 | 3.0 | 2.799 | 0.596 | 5.00 | five unit cells in series measured at an effective area |

Examples 1 and 2 have a semiconductor layer of a two-layer structure and can be compared with Comparative Example 1. Examples 3 and 4 have a semiconductor layer of a three-layer structure and can be compared with Comparative Example 2. Example 5 allows light to enter from a catalyst layer side and can be compared with Comparative Example 3. Examples 6 and 7 have a structure of connecting four unit cells in series and five unit cells in series, respectively and can be compared with Comparative Examples 4 and 5. As is apparent from Table 2, in all of the above-mentioned combinations, the photoelectric conversion efficiency (Eff.) of Examples is higher than that of Comparative Examples and this attests the effects in accordance with the present invention.

Further, this application claims priority to JP application No. 2004-228122, filed on Aug. 4, 2004, which is herein incorporated by reference.

The invention claimed is:

1. A dye-sensitive solar cell comprising a photoelectrode comprising a conductive substrate and a semiconductor layer formed on the conductive substrate, the semiconductor layer being formed of semiconductor particles, the semiconductor layer having a plurality of layers, the plurality of layers being different in an average particle diameter of semiconductor particles from one another, a distal layer of the plurality of layers, placed at a location farther from the substrate, covering 20% or more of side faces of a proximal layer of the plurality of layers, placed at a location closer to the substrate, wherein the side faces of the proximal layer and side faces of the distal layer are tilted with regards to a direction perpendicular to a principal face of the conductive substrate, the proximal layer and the distal layer absorb a sensitizing dye thereon, the sensitizing dye, functioning as a photosensitizer, transferring an electron to the semiconductor particles of the proximal and the distal layers by optical energy, and the distal layer and the conductive substrate contact each other so as to form a contact surface.

2. The dye-sensitive solar cell of claim 1, wherein the distal layer contains semiconductor particles with a larger average particle diameter than the proximal layer.

3. The dye-sensitive solar cell of claim 2, wherein the distal layer contains semiconductor particles with an average particle diameter of 100 nm or more, and the proximal layer contains semiconductor particles with an average particle diameter of 50 nm or less.

4. The dye-sensitive solar cell of claim 1, wherein the distal layer contains semiconductor particles with a smaller average particle diameter than the proximal layer.

5. The dye-sensitive solar cell of claim 4, wherein the distal layer contains semiconductor particles with an average particle diameter of 50 nm or less, and the proximal layer contains semiconductor particles with an average particle diameter of 100 nm or more.

6. The dye-sensitive solar cell of claim 1, wherein the semiconductor layer absorbs a sensitizing dye thereon.

7. The dye-sensitive solar cell of claim 6, wherein the sensitizing dye is a Ruthenium bipyridine dye.

8. The dye-sensitive solar cell of claim 1, wherein the semiconductor particles are made of titanium oxide.

9. The dye-sensitive solar cell of claim 1, wherein the semiconductor particles contained in the distal layer are made of anatase titanium oxide.

* * * * *